United States Patent [19]
Johnson

[11] 3,721,503
[45] March 20, 1973

[54] ROTARY TOOL HOLDER

[75] Inventor: Bernard H. Johnson, Plymouth, Mich.

[73] Assignee: Gatco Rotary Bushing Company, Plymouth, Mich.

[22] Filed: Feb. 8, 1971

[21] Appl. No.: 113,356

[52] U.S. Cl. ................................ 408/238, 308/174
[51] Int. Cl. ............................................ B23b 51/12
[58] Field of Search ....... 408/238, 239, 241; 308/174

[56] References Cited

UNITED STATES PATENTS 3,168,359  2/1965  Murphy ............................ 308/174

FOREIGN PATENTS OR APPLICATIONS 992,583  5/1965  Great Britain ........................ 408/238

Primary Examiner—Francis S. Husar
Attorney—Edward M. Apple

[57] ABSTRACT

This Application discloses a wear free, precision, holder for a machine tool such as used for cutting, boring, end facing and the like. The invention resides in the particular combination and arrangement of elements and particularly in the provision of a holder having a fixed concentric shell portion and a rotatable body portion, with a plurality of small diameter needle roller bearings positioned between the said shell and said body to effect a closely spaced, frictionless, working relation between said fixed and rotatable portions.

5 Claims, 5 Drawing Figures

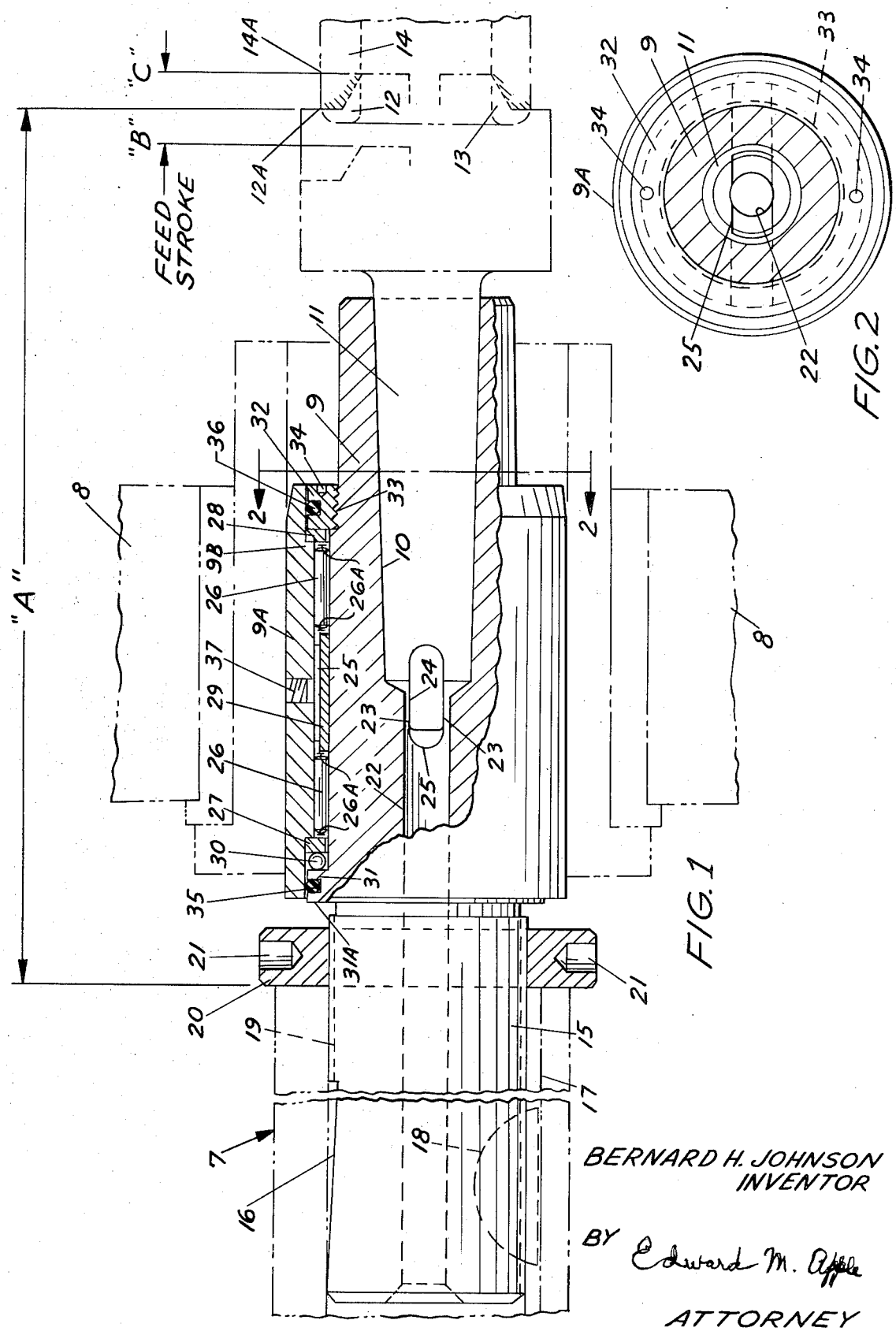

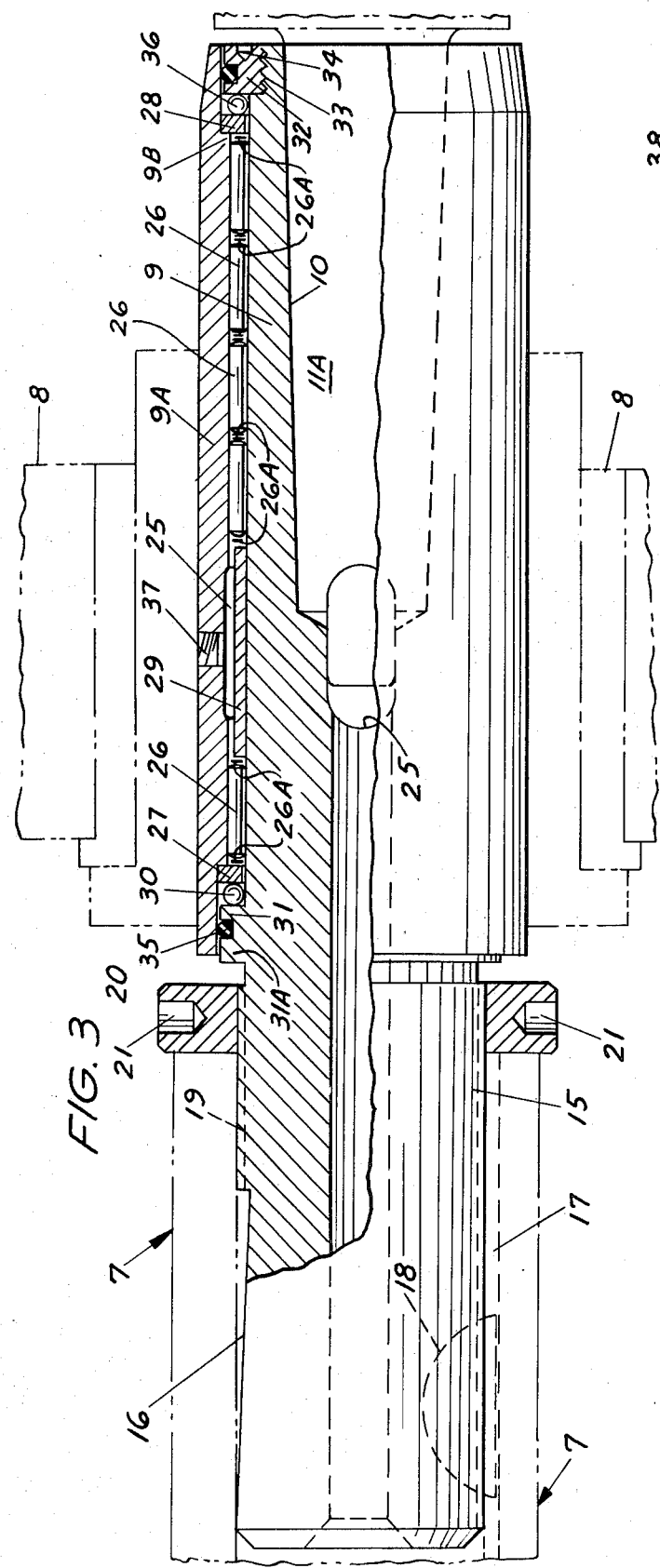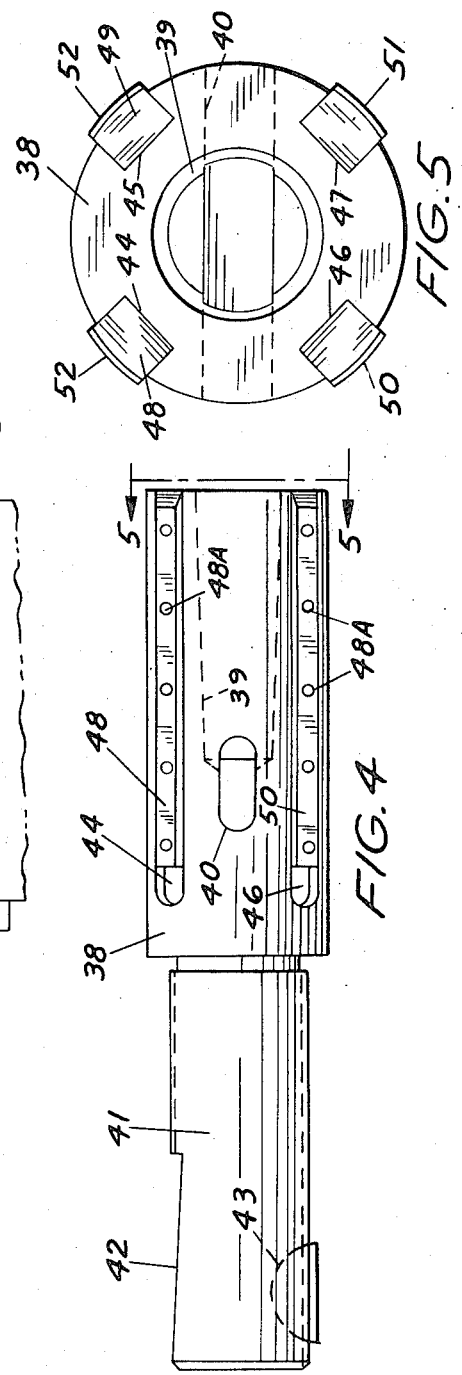

ROTARY TOOL HOLDER

This invention relates to machine tools and especially to production, carbide cutting tools.

An object of the invention is to provide a machine tool holder, which insures the operator of maximum precision at all stages of the operation to which it is applied.

Another object of the invention is to provide a tool holder, with a fixed concentric outer shell and a rotatable body, between which are positioned needle roller bearings, so arranged that said shell and said body serve as the outer and inner raceways for said needle bearings.

Another object of the invention is to provide a machine tool, with a holder which is practically frictionless in operation.

Another object of the invention is to provide a tool holder, which is constructed and arranged to have a firm radial support, which support is closely spaced to the cutting area.

Another object of the invention is to provide a production machine tool holder, which needs little or no subsequent machining, grinding, or dressing out, when once placed in operation.

Another object of the invention is to provide a holder for a machine tool, which will remain in continuous operation, without the necessity of periodic shut downs of the machine, for realignment of the tool, and the like.

Another object of the invention is to provide a machine tool holder, which is constructed and arranged, so that the radial pressures on the tool, during operation, will be uniform throughout the full 360° of rotation of the tool, thereby insuring precision tolerences on the workpiece, and minimizing the possibility that the tool would get out of proper working relation with the workpiece.

Another object of the invention is to provision of a machine tool holder, which is simple in construction, economical to manufacture, and efficient in operation.

Another object of the invention is to provide a tool holder, which is constructed and arranged to provide proper cutting speeds for carbide tools, without the possibility of having the tool, or the tool holder becoming overheated, because of the frictional engagement of the rotating and non-rotating parts.

Another object of the invention is to provide a tool holder, which is constructed and arranged to prevent undue wear on the tool holder, on the side of the holder, opposite the cutting pressure.

Another object of the invention is to provide a device of the character indicated, which eliminates all wear on the outside diameter of the tool holder body.

Another object of the invention is to provide a tool holder, which is constructed and arranged to minimize all thrust friction, during the operation of the tool.

Another object of the invention is to provide a tool holder with means for pre-gauging the relation of the cutting end of the tool, with respect to the workpiece.

Another object of the invention is to provide a holder for a carbide tool, with a very close radial fit, between the rotatable portion and its stationary support, without the development of frictional heat.

Another object of the invention is to provide a tool holder of the character indicated, which is constructed and arranged so that proper lubrication may be provided between the rotating and non-rotating elements of the device.

In modern machine practice it has long been, and now is the custom to use a tool holder, which has longitudinal, peripheral slots in which are positioned wear strips of bronze, or other material, which are ordinarily widely spaced from one another around the outside periphery of the tool holder. These wear strips must regularly be ground, or dressed, to compensate for uneven wear and misalignment of the tool. This is particularly a problem if the tool has a single carbide cutting element, or even a double carbide cutting element. In either case, the tool exerts different radial pressures on the holder, when the cutting elements are in radial planes positioned between the wear strips. This results in uneven wear on the tool and the holder which has to be corrected from time to time. This is expensive in time, labor, and materials and results in "-down time" for the entire machine which must be taken out of production during the repairs.

It is therefore another object of the invention to obviate the foregoing difficulties.

The foregoing and other objects and advantages of the invention will become more apparent as the description proceeds, reference being made from time to time to the accompanying drawing, forming part of the within disclosure, in which drawing:

FIG. 1 is an elevational view, with parts in section, of a machine assembly, incorporating the device embodying the invention and illustrating its application to a production workpiece utilizing a tool having two carbide tips. The invention device is shown in solid lines.

FIG. 2 is a section taken substantially on 2—2 of FIG. 1.

FIG. 3 is a modified form of the device shown in FIG. 1.

FIG. 4 is a reduced, elevational view, of a conventional tool holder, which is provided with longitudinal, or linear wear strips.

FIG. 5 is an enlarged end view of the device shown in FIG. 4 taken substantially on the line 5—5 of FIG. 4.

Referring now more particularly to the drawing, it will be understood that in the embodiment herein disclosed, the reference character 7 indicates the drive spindle of a conventional lathe, or other machine, for operating machine tools. The reference character 8 indicates, in general, the fixture bushing support assembly for the tool holder, the principal parts of which are indicated by the reference characters 9 and 9A. Both parts 9 and 9A are made of heat treated, tool steel, f an approximate hardness of Rockwell, Scale C, 58–262. The body portion 9 is provided with a Morse taper 10, in which is fitted a machine tool 11, which has at its enlarged end, a pair of carbide blades 12 and 13, which are adapted to do work on a workpiece 14, which in this application is a casting, which is supported in any conventional manner.

The body 9 of the tool holder has an extension 15, which is provided with a flat surface 16, opposite which is a keyway 17, arranged to receive a Woodruff key 18, for rotating the tool holder body 9 and the tool 11. The extension 15 is externally threaded, as at 19, for receiving an Acme nut 20, which is received on the threads 19. The nut 20 is provided with bores 21, for receiving a spanner wrench, which is used to rotate the nut 20.

The nut 20 serves as a gauge point to pre-determine the length of the work stroke as indicated by the arrows marked "A." The feed stroke of the tool is indicated by the arrows "B" and "C." The tool holder body 9, in addition to the Morse taper 10, is provided with a longitudinal bore 22, which has flat portions 23 for receiving the tang 24 of the tool. The tool holder body 9 is also provided with a radial slot 25, which is provided for insertion of a screw driver, or the like, so that the tool 11 may be ejected from the tool holder body 9 when it is desired to change tools.

As stated above, my improved tool holder consists of an outer, concentric, thin, shell portion 9A, which remains stationary with the fixture bushing assembly 8. The body portion 9 of the tool holder rotates with the tool 11 within the shell portion 9A. Interposed between the fixed shell portion 9A and the rotating body portion 9 of the tool holder, is a plurality of small diameter needle bearings 26, which are retained by rings 26A, 27 and 28 and spaced by a ring 29. The ring 29 also prevents the bearing 26 from falling into the radial slot 25. A plurality of ball bearings 30 are positioned between the ring 27 and a shoulder 31, which bearings 30 absorb the thrust of the tool during operation. The needle bearing assembly 26–29 and the thrust bearings 30, are finally retained between the members 9 and 9A by means of a nut 32, which is threaded onto the tool holder body 9, as at 33. The nut 32 contacts the ring 28, which in turn contacts a shoulder 9B on the shell 9A. This locks the shell against linear movement and insures freedom of rotation of the body 9. The nut 32 is provided with bores 34 for receiving a spanner wrench. "O" rings 35 and 36 are provided to seal the lubricant which may be introduced through the bore 37.

In FIG. 3, I illustrate a modified form of the invention, in which the tool 11A is larger than the tool 11, shown in FIG. 1. This, of course, necessitates the use of a greater number of the needle roller bearings 26, to properly support the rotating body 9 and the tool in closely spaced relation with the non-rotatable shell portion 9A of the holder. In other respects, the structure of FIG. 3 is similar to that of FIG. 1. The cutting element of the modified tool 11A is not shown, but it could be a single carbide tipped tool, or a double blade tool. Of course, when a single cutting blade is used, there is a greater tendency for the holder to wear unevenly, on the side of the holder opposite the point of the radial pressure, during operation.

Therefore, the use of my improved holder has many advantages over a holder of the conventional type, such as shown in FIGS. 4 and 5. The conventional tool holder, FIGS. 4 and 5, has a body portion 38, which has a tapered opening 39, for receiving a tool, a radial slot 40, and an extension 41 which has a flat portion 42 and a keyway 43. The outside periphery of the body 38, of the tool holder, now known to public, is provided with longitudinal slots 44, 45, 46 and 47, in which are inserted bronze wear strips 48, 49, 50 and 51, which are secured by machine screws 48A. The wear strips 48–51 are machined, or ground, with proper curved faces 52, so that they will fit inside the bushing of a conventional fixture bushing assembly 8, FIGS. 1 and 3. It will be noted that these wear strips 48–51 are widely spaced from one another, FIG. 5, so that the tool holder is not evenly supported, throughout its circumference, in the conventional bushing 8. Certain of the strips 48–51 will wear faster than others, particularly on the side, or sides, opposite the radial pressure exerted by the cutting blade, or blades. This uneven wear must be periodically corrected by removing the tool holder from the machine and dressing or replacing the wear strips. This results in "down time" for the machine, and if on a production operation, obviously increases the cost of production.. Such problems are entirely eliminated with the use of my improved tool holder as previously described.

In assembling my improved holder, I prefer to hold the extension 15 in a vise, or jig, with the open end of the holder in upright position. The "O" ring 35 is then positioned in the space between the shoulder 31 and its extension 31A. The balls 30 are then put in place and the ring 27 is superimposed on the balls 30. The outer shell 9A is then received over the body 9 and moved to the shoulder 31–31A and the ring 27, leaving a confined space between the body 9 and the shell 9A. The needle roller bearings and spacer 29 are then inserted and the ring 28 is introduced. Lastly, the nut 34, with its "O" ring 36, is threaded onto the body 9, as at 33, and the assembly is lubricated as at 37 and is ready for operation.

In setting up the device, the extension 15 is first inserted into the drive spindle 7 of the lathe, so that the key 18 engages the slot 17. The nut 20 is then rotated on the threads 19, until it contacts the end face of the lathe spindle 7. The contacting face of the nut 20 may then be used as a gauging point, for pre-determining the work stroke of the tool, which is the distance between the points 12A and 14A FIG. 1.

It is believed that the operation of the device is obvious from the foregoing description.

Having described my invention, what I claim and desire to secure by Letters Patent is:

I claim:

1. In a device of the character described, the combination of a body member, having an extension for being received in the drive spindle of a power driven machine, said body having an opening for receiving therein a machine tool, a comparatively thin walled, cylindrical shell having a constant diameter, and a chamfered leading end, and captively secured at opposite ends to said body, at least one thrust element between said body and said shell, and a plurality of radial support needle roller bearing elements positioned between said shell and said body and arranged to permit said shell to remain stationary and said body to rotate, said body and said shell assembly being arranged for unlimited linear motion in a fixture of said machine.

2. The structure of claim 1, in which said bearing elements are retained between said shell and said body by means, including a shoulder formed at one end of said body and a nut, which is concentric with an externally threaded area on said body, and arranged to hold the said shell and said body in predetermined relation, during the linear travel of the body and shell assembly.

3. The structure of claim 1, in which the space between said shell and said body is closely restricted, there being means to introduce a lubricant to said restricted space and sealing means at the ends of said space.

4. The structure of claim 1, including a nut received on a threaded portion of said body and underlying an end portion of said shell, therebeing an "O" ring positioned in a peripheral groove formed in said nut, and arranged to seal the space between said body and said shell.

5. The structure of claim 1, in which said body has an externally threaded area with a nut thereon, arranged to contact a ring, which in turn contacts a shoulder on said shell, to minimize the linear movement of said shell but to insure freedom of rotation of the said body relative to the said shell.

* * * * *